United States Patent [19]

Fujita et al.

[11] Patent Number: 4,652,719

[45] Date of Patent: Mar. 24, 1987

[54] WORKPIECE FEEDING APPARATUS IN SEAM WELDING MACHINE

[75] Inventors: Yoshihide Fujita, Hidaka; Hirofumi Morita, Shiki, both of Japan

[73] Assignee: Honda Giken Kogyo Kabushiki Kaisha, Tokyo, Japan

[21] Appl. No.: 739,798

[22] Filed: May 31, 1985

[51] Int. Cl.[4] .......................... B23K 11/06; B23K 37/04
[52] U.S. Cl. ....................................... 219/82; 219/158; 901/42
[58] Field of Search ...................... 219/82, 117.1, 125.1, 219/158, 159; 901/41, 42, 40, 29

[56] References Cited
FOREIGN PATENT DOCUMENTS

| 3002012 | 8/1980 | Fed. Rep. of Germany | 901/29 |
| 212880 | 12/1983 | Japan | 219/82 |
| 138679 | 11/1960 | U.S.S.R. | 219/159 |

OTHER PUBLICATIONS

"Resistance Welding at Work", Sciaky Bros., Inc. Jan. 12, 1948.

Primary Examiner—E. A. Goldberg
Assistant Examiner—C. M. Sigda
Attorney, Agent, or Firm—Armstrong, Nikaido, Marmelstein & Kubovcik

[57] ABSTRACT

A combination of a seam welding machine having a machine body and a pair of electrode rolls thereon and a workpiece feeding mechanism for feeding a portion of a three dimensionally curved workpiece between the electrode rolls. The mechanism includes a robot which is three-dimensionally movable and which has a wrist portion of three shaft construction supporting a chucking device for holding the workpiece. The robot is mounted on the machine body of the seam welding machine.

6 Claims, 8 Drawing Figures

WORKPIECE FEEDING APPARATUS IN SEAM WELDING MACHINE

BACKGROUND OF THE INVENTION

This invention relates to a workpiece feeding apparatus in a seam welding machine for automating a seam welding operation on a workpiece such as a fuel tank for a two-wheeled vehicle or the like.

It has been usual hitherto that, when a workpiece is to be Mig or Tig welded, the workpiece is fixed and the welding is carried out by a welding torch moved by a robot. However, if a seam welding is intended to carried out under the condition that the workpiece is fixed, a welding unit of comparatively large weight comprising a pair of electrode rolls, a pressure applying mechanism and a rotation driving mechanism must be mounted on a robot. As a result, the working speed of the robot becomes slow. Consequently, the productivity of the welded workpieces becomes low.

Alternatively, such an arrangement can be considered that a stationary type seam welding machine installed on a floor is used, and the workpiece is moved by a robot so that a portion of the workpiece to be welded is fed between a pair of electrode rolls provided on the seam welding machine. However, with this arrangement, in a case where it is applied to the portion to be welded which is three-dimensionally curved, such as a butt flange portion c of a tank outer panel a and a tank bottom panel b of a fuel tank A for a two-wheeled vehicle as shown in FIG. 3, three-dimensional movement control of the workpiece and a posture control thereof are required.

If, in this case, the robot is installed on a floor, an installation floor space for the entire apparatus including the seam welding machine is increased. In addition, cooling water applied to the workpiece is liable to be applied also to the robot, and there is fear of generation of rust or other bad effect thereon.

OBJECT AND SUMMARY OF THE INVENTION

This invention has for its object to provide an apparatus solving the foregoing problems. The invention is characterized in that a robot having a wrist portion of three-axial construction supporting a chucking means for holding a workpiece which robot can move three-dimensionally in any desired direction is mounted on a machine body of a seam welding machine.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
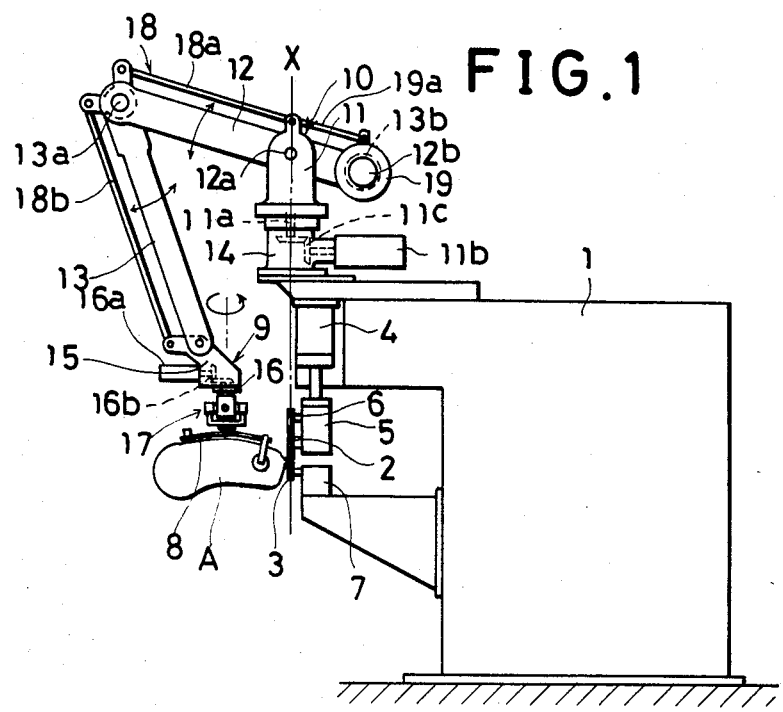
FIG. 1 is a side view of one embodiment of this invention including a seam welding machine.
Figure 3:
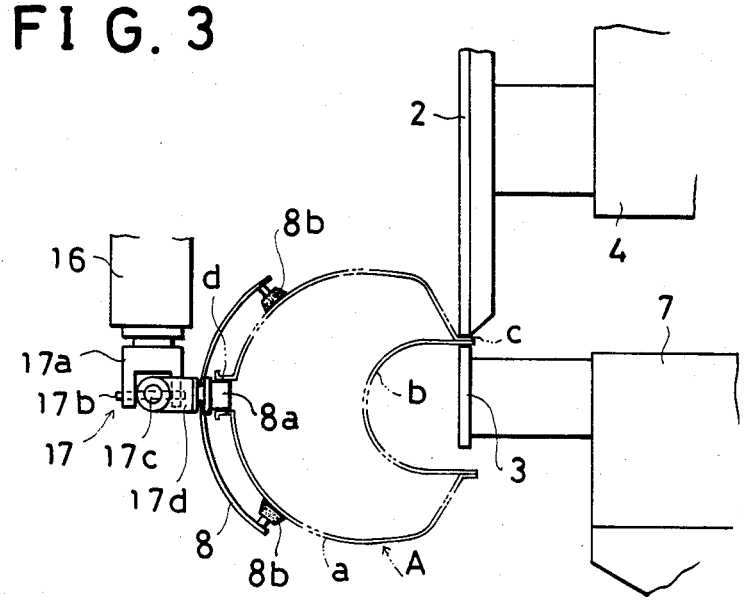
FIG. 3 is an enlarged side view of an important portion thereof.
Figure 2:
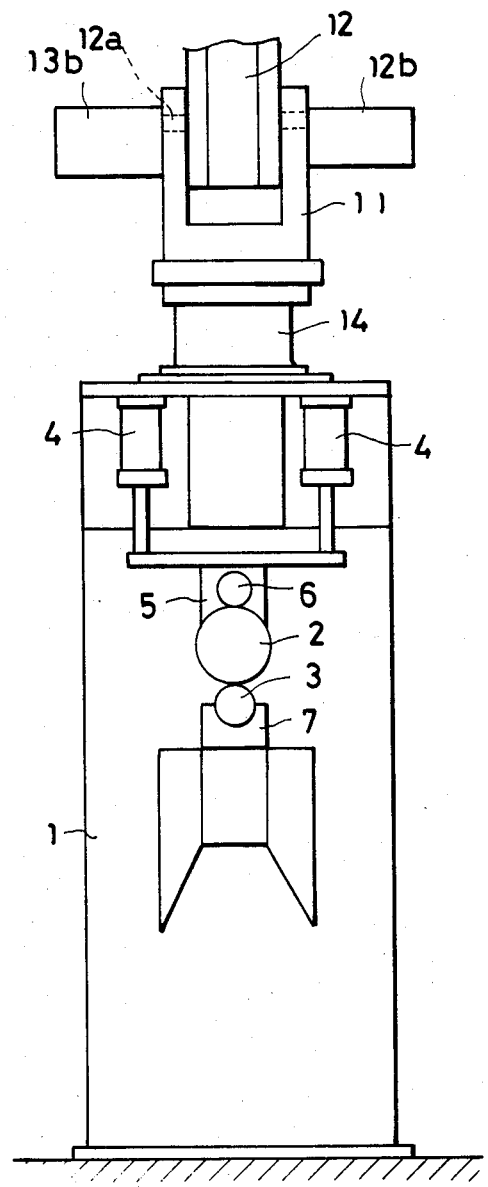
FIG. 2 is a front view thereof.

Embodying examples of this invention will now be explained with reference to the accompanying drawings:

Referring to FIGS. 1 and 2, a machine body 1 of a seam welding machine has a pair of upper and lower electrode rolls 2, 3 provided on a front portion thereof. As shown in FIG. 2, the upper electrode roll 2 is rotatably supported on an electrode holder 5 which is movable upwards and downwards by a pair of right and left pressure applying cylinders 4, 4. The holder 5 is provided thereon with a knurled member 6 which is in abutment with a circumferential surface of the upper electrode roll 2 so that the upper electrode roll 2 may be driven to rotate through rotation of the knurled member 6 by a driving source (not illustrated). The lower electrode roll 3 is rotatably supported on an electrode holder 7 fixed to the machine body 1 so that if the upper electrode roll 2 is lowered by the pressure applying cylinders 4, 4, a butt flange portion c of a fuel tank A, that is, the workpiece may be held between the two electrode rolls 2, 3. When the upper electrode roll 2 is rotated, the flange portion c may be subjected to seam welding by the application of electric power to the electrodes.

According to this invention, a robot 10 having such a function that it can move three-dimensionally in any desired direction its wrist portion 9 of three-axial construction supporting a chucking means 8 for holding the fuel tank A is mounted on the foregoing machine body 1.

More in detail, in the illustrated example, the robot 10 comprises a robot main body 11 which is turnable about a rotary shaft 11a extending in the vertical direction, a first arm 12 extending forwards from the robot main body 11 and attached to the main body 11 through a laterally extending pivot shaft 12a provided on a rear end portion thereof to be swingable upwards and downwards, and a second arm 13 extending downwards from the first arm 12 and attached to the first arm 12 through a laterally extending pivot shaft 13a provided on an upper end portion thereof to be swingable forwards and rearwards. This robot 10 is mounted on an upper surface of the machine body 1 through a base member 14 provided on a lower side of the robot main body 11. The wrist portion 9 thereof is attached to a lower end of the second arm 13 so that the wrist portion 9 may be movable three-dimensionally in any desired direction by a composite movement of the robot main body 11 and the two arms 12, 13.

The robot main body 11 is arranged to be turnable through a bevel gear means 11c by an electric motor 11b provided on the base member 14. The respective arms 12, 13 are arranged to swing by respective electric motors 12b, 13b provided right and left on an attaching base 19 pivotally provided on a rearwardly extended portion of the first arm 12, through respective chains (not illustrated) applied between the motors 12b, 13b and the shafts 12a, 13a, respectively. A link 19a is provided between the base 19 and the main body 11 so as to be in parallel with the extended portion.

In the foregoing example, the two arms 12, 13 are constructed to be swingable arms. However, these two arms 12, 13 may be modified into a right-angled coordinates type arm mechanism with the first arm 12 movable to advance and retreat in front and rear directions in relation to the robot main body 11, and the second arm 13 movable to advance and retreat in upward and downward directions in relation to the first arm 12.

This modified arrangement may be further modified into a right-angled three-dimensional coordinates type one by forming the robot main body 11 into one which is slidable laterally.

The wrist portion 9 is of a three-shaft construction so that a wrist main body 15 thereof attached to the lower end of the second arm 13 is provided with a rotary shaft 16 which s turnable through a bevel gear means 16b by an electric motor 16a. A cross joint 17 comprising two shafts 17b, 17c crossing one another at right angle is attached to the rotary shaft 16.

Figure 4:
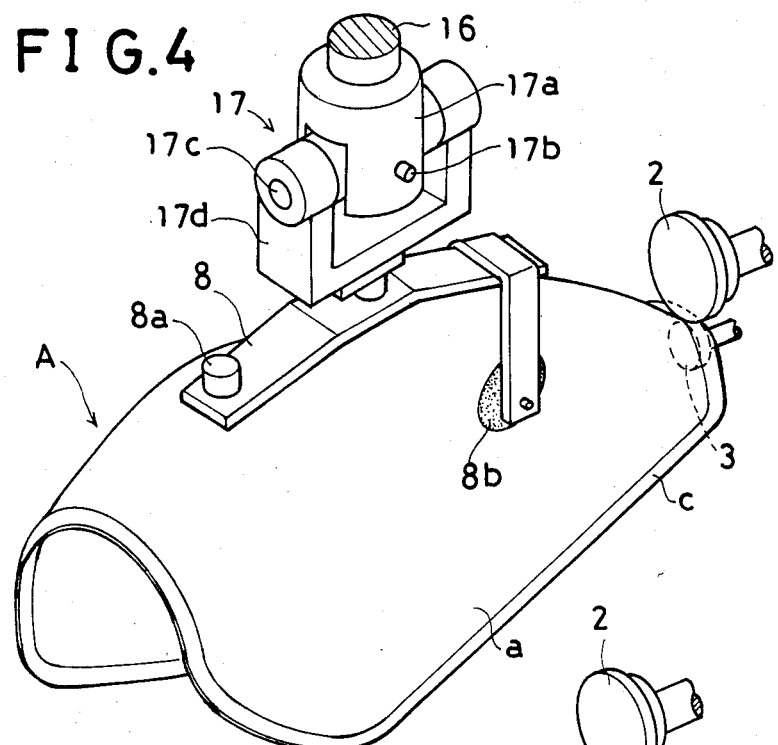
FIGS. 4–6 are perspective views of important portions thereof for explaining the operations thereof.

More in detail, as shown clearly in FIG. 4, one of the shafts 17b, 17c of the cross joint 17, that is, shaft 17b is supported on a stationary yoke 17a formed integrally on a lower end of the rotary shaft 16. The other shaft 17c is supported on a movable yoke 17d. The chucking means 8 is attached to the yoke 17d so that the fuel tank A held by the chucking means 8 may be changed three-dimensionally to assume any desired posture by a composite movement of the three shafts 16, 17b, 17c.

The wrist main body 15 is so arranged that its constant posture may be kept, even if there is any swingable movement of the two arms 12, 13 (FIG. 1) by a parallel link mechanism 18 comprising a pair of links 18a, 18b provided along on the two arms 12, 13. Thus, the rotary shaft 16 supported thereon can be always kept to be in the vertical direction.

The chucking means 8 is provided with a chucking member 8a for holding a charging opening portion d of the fuel tank A and a pair of attracting pads 8b, 8b for sticking fast to an outer surface of the tank A.

Figure 5:
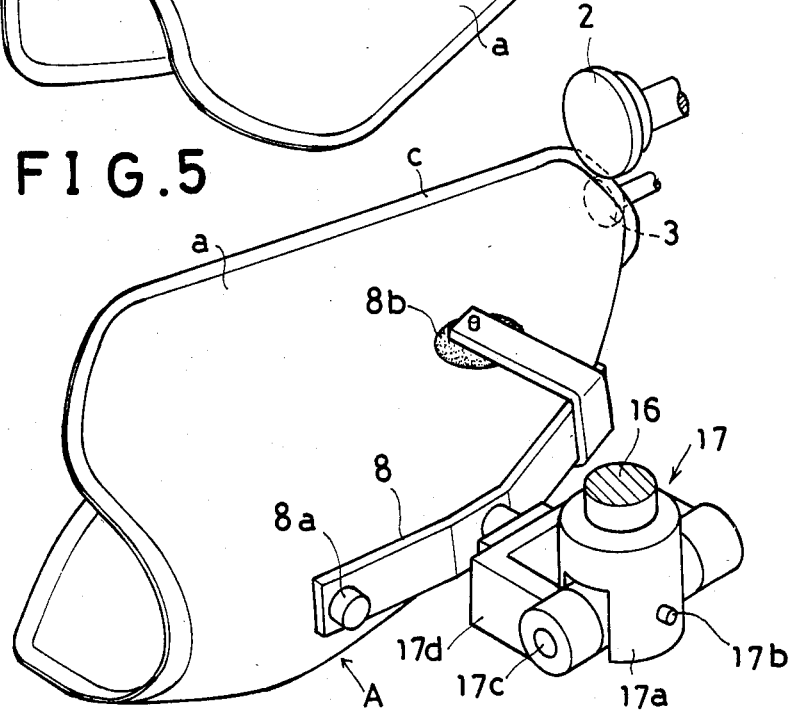
Figure 6:
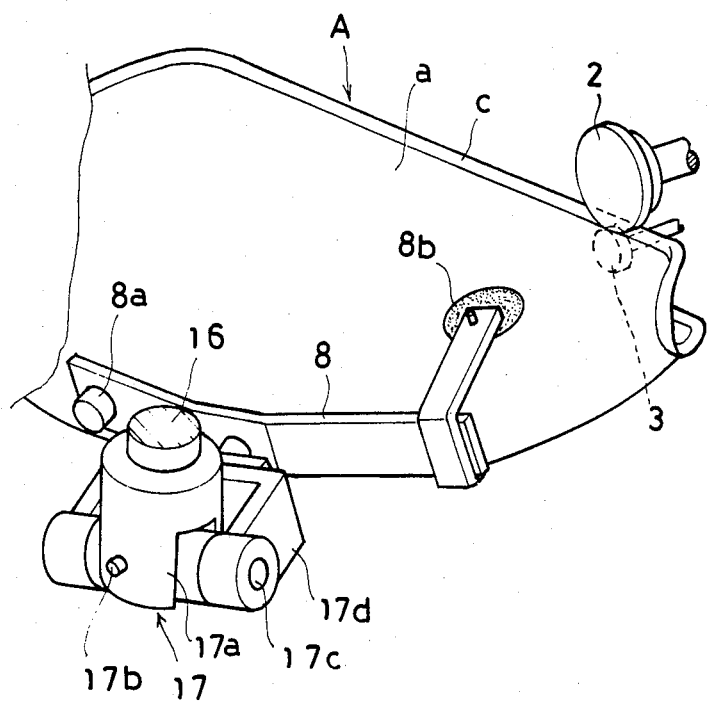

Next, the operation of the apparatus will be explained as follows:

Under the condition that the fuel tank A is held by the chucking means 8, a desired part of the flange portion c is placed on the lower electrode roll 3. The upper electrode roll 2 is lowered to hold the flange portion c between the two electrode rolls 2, 3. Thereafter, the upper electrode roll 2 is rotated while electric power is supplied thereto and at the same time the robot main body 11 and the two arms 12, 13 are operated so as to move the wrist portion 9 along a three-dimensional locus previously entered into the control means (not shown). In addition, the posture of the fuel tank A is changed three-dimensionally by respective movement of the three shafts 16, 17b, 17c of the wrist portion 9, whereby every part of the flange portion c to be welded in continuously fed between the two electrode rolls 2, 3 as shown in FIGS. 4-6. During this operation, the fuel tank A is applied with cooling water through a water supply pipe (not illustrated) so as not to generate a thermal deformation of the tank A.

By the way, in practice, due to such factor as a difference between the feeding speed of the fuel tank A and such a leading in speed of the part of the flange portion c between the two electrode rolls 2, 3 that is caused by rotation of the upper electrode roll 2, a thermal deformation caused by welding, or other factors, the advancing direction of the two electrode rolls 2, 3 in relation to the flange portion c to be welded sometimes happens to deviate from a normal welding line, and therefor it is desirable that this deviation can be properly compensated by an operator.

In this case, it is intended to compensate the advancing direction of the two electrode rolls 2, 3 by such a manner that the fuel tank A be turned by turning of the rotary shaft 16 of the wrist portion 9 which is in parallel with the vertical axial line X connecting between the centers of the two electrode rolls 2, 3, but the fuel tank A actually cannot be turned because the part of the flange portion c is held firmly between the two electrode rolls 2, 3. After all, for achieving the compensation of the advancing direction effectively, it is necessary to turn the fuel tank A about the axial line X in relation to the two electrode rolls 2, 3.

In this respect, in the foregoing example, there is provided an arrangement wherein the robot 10 is mounted on the machine body 1 to be in alignment at the rotary shaft 11a of the robot main body 11 with the axial line X so that the compensation of the advancing direction may be made merely by turning of the robot main body 11.

Incidentally, if the rotary shaft 11a is not in alignment with the axial line X, the fuel tank A can be turned about the axial line X only when the two arms 12, 13 and the rotary shaft 16 are operated simultaneously with the turning of the robot main body 11.

Incidentally, if the rotary shaft 11a is not in alignment with the axial line X, the fuel tank A can be turned about the axial line X only when the two arms 12, 13 and the rotary shaft 16 are operated simultaneously with the turning of the robot main body 11. Thus it is extremely difficult in practice for an operator to carry out these operations by operating a control means for those members 12, 13 and 16.

In the foregoing example, the robot 10 is arranged to be turnable about the axial line X in relation to the two electrode rolls 2, 3, but almost the same effect can be obtained by such an arrangement that the two electrode rolls 2, 3 themselves are arranged to be turnable about the axial line X.

Figure 8:
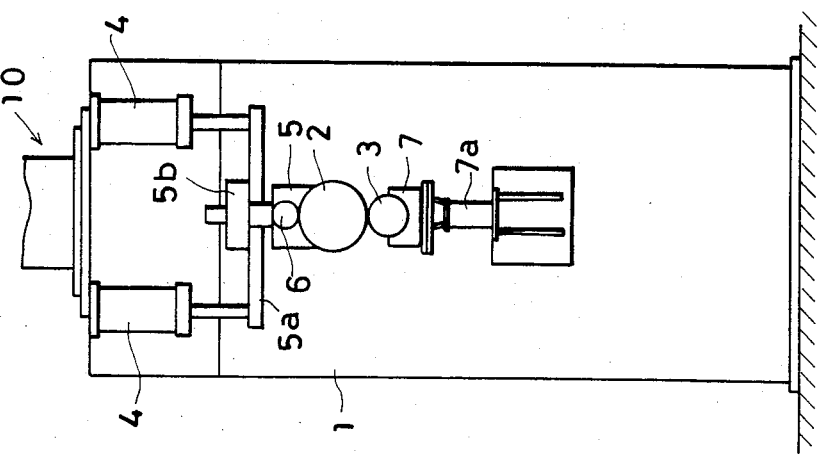
FIG. 8 is a front view thereof.
Figure 7:
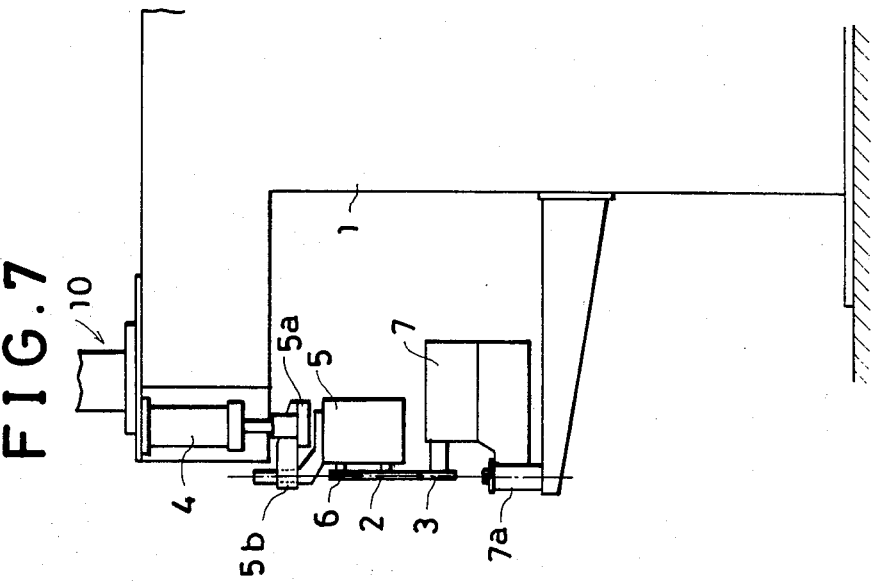
FIG. 7 is a side view of another embodiment of this invention.

FIGS. 7 and 8 show an embodying example of this type of arrangement, wherein the electrode holder 5 for the upper electrode roll 2 is rotatably supported on such a bearing portion 5b of the same axis with the axial line X that is provided on a frame base 5a which is movable upwards and downwards by the cylinders 4, 4. Additionally, the electrode holder 7 for the lower electrode roll 3 is rotatably supported on a bearing portion 7a of the same axis with the axial line X that is provided on the machine body 1. The two holders 5, 7 are arranged to be turnable synchronously one with another by a proper driving source (not illustrated).

Thus, according to this invention, a workpiece is held through a chucking means on a wrist portion of three-shaft construction so that a three-dimensional posture control of the workpiece may be effected. Additionally, the wrist portion is arranged to be movable three-dimensionally in any desired direction by a robot so that a three-dimensional movement control of the workpiece may be effected. Thus, even if a portion of the workpiece to be welded is a three-dimensionally curved one, a seam welding can be carried out at a high efficiency and automatically by feeding the portion to be welded continuously between a pair of electrode rolls of a seam welding machine. Additionally, because the robot is mounted on a machine body of the seam welding machine, installation space can be sufficient only with that for the seam welding machine. This is advantageous in using effectively a factory floor space by that amount. At the same time, there can be prevented generation of rusting of the robot or of other bad effect thereon caused by splashing on the robot of cooling water applied to the workpiece. Thus, the robot can be improved in its durability or longevity.

It is readily apparent that the above-described workpiece feeding apparatus in seam welding machine meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. The combination of a workpiece feeding apparatus and a welding machine comprising:
   a seam welding machine having a machine body and a pair of electrode rolls provided on the machine body to engage a workpiece for welding a seam thereon;
   a workpiece feeding apparatus comprising a robot mechanism supporting a chucking means for holding a workpiece, said robot mechanism being arranged to move said workpiece three dimensionally in rotation and translation in any desired direction to assume any posture;
   said workpiece feeding apparatus being arranged with respect to said seam welding machine to hold a workpiece in position for engagement by said electrode rolls along a three-dimensionally curved portion of said workpiece to be welded, and for controlling movements and posture of said workpiece to maintain said workpiece in engagement with said electrode rolls along said portion to be welded; and
   said robot mechanism of said workpiece feeding apparatus comprising a robot main body mounted on said welding machine body, said robot main body and said electrode rolls being arranged to be relatively turnable with respect to each other about at least one of a pair of parallel axes, at least one of which axes is an axial line passing through the centers of said electrode rolls.

2. An apparatus as claimed in claim 1, wherein the robot and the two electrode rolls are arranged to be relatively turnable about a single axial line connecting between the centers of the two electrode rolls.

3. An apparatus as claimed in claim 2, wherein the robot comprises a robot main body which is turnable, a first arm pivotally attached to the robot main body, and a second arm pivotally attached to a forward end of the first arm, and wherein a rotary shaft of the robot main body is in alignment with said axial line.

4. An apparatus as claimed in claim 2, wherein the two electrode rolls are so arranged as to be turnable about said axial line.

5. An apparatus as claimed in claim 1 wherein said robot is arranged to be turnable with respect to said welding machine about one of said axes.

6. An apparatus as claimed in claim 1 wherein said electrode rolls are arranged to be turnable with respect to said welding machine about an axial line passing through the centers of said electrode rolls.

* * * * *